United States Patent
Fujimori (10) Patent No.: US 12,205,557 B2
(45) Date of Patent: Jan. 21, 2025

(54) IMAGE GENERATION DEVICE, TERMINAL DEVICE, AND IMAGE GENERATION METHOD

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 374 days.

(21) Appl. No.: 17/706,162

(22) Filed: Mar. 28, 2022

(65) Prior Publication Data

US 2022/0311937 A1   Sep. 29, 2022

(30) Foreign Application Priority Data

Mar. 29, 2021   (JP) .................................. 2021-055280

(51) Int. Cl.
*G06T 3/4038*   (2024.01)
*G09G 5/14*   (2006.01)

(52) U.S. Cl.
CPC ............ *G09G 5/14* (2013.01); *G06T 3/4038* (2013.01); *G06T 2207/20212* (2013.01); *G09G 2340/0407* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 2010/0110294 A1 | 5/2010 | Oka | |
| 2010/0325577 A1 | 12/2010 | Olsen | |
| 2014/0078182 A1* | 3/2014 | Utsunomiya | ............ G09G 5/37 |
| | | | 345/666 |
| 2019/0012130 A1 | 1/2019 | Honda | |
| 2020/0382750 A1 | 12/2020 | Ano | |

FOREIGN PATENT DOCUMENTS

| | | |
|---|---|---|
| JP | 2008-146495 A | 6/2008 |
| JP | 2010-108372 A | 5/2010 |
| JP | 2019-015834 A | 1/2019 |
| JP | 2020-194107 A | 12/2020 |

* cited by examiner

*Primary Examiner* — Robert J Craddock
(74) *Attorney, Agent, or Firm* — Oliff PLC (57) ABSTRACT

An image generation device includes one or a plurality of processors executing: communicating with a first terminal device executing a first application program and a second application program; acquiring first image data representing a first image displayed by the first terminal device according to the first application program and first resolution information representing a resolution of the first image; acquiring second image data representing a second image displayed by the first terminal device according to the second application program and second resolution information representing a resolution of the second image; deciding a layout for arranging the first image and the second image in an output image, based on the first resolution information and the second resolution information; and generating an output image having the first image and the second image arranged therein, based on the layout, the first image data, and the second image data.

6 Claims, 6 Drawing Sheets

IMAGE GENERATION DEVICE, TERMINAL DEVICE, AND IMAGE GENERATION METHOD

The present application is based on, and claims priority from JP Application Serial Number 2021-055280, filed Mar. 29, 2021, the disclosure of which is hereby incorporated by reference herein in its entirety.

BACKGROUND

1. Technical Field

The present disclosure relates to an image generation device, a terminal device, and an image generation method.

2. Related Art

JP-A-2019-015834 discloses a display device that allocates images supplied respectively from a plurality of image supply devices, one by one to a plurality of partial areas acquired by splitting a display area, and thus displays the images. The display device disclosed in JP-A-2019-015834 dynamically changes the boundary between the partial areas, based on resolution information supplied with the images from the image supply devices, and thus minimizes a blank space where no image is displayed, The technique disclosed in JP-A-2019-015834 has a problem in that the image supplied from one image supply device to the display device is to one image. When the image supply device is a personal computer or the like, this limitation may be avoided in the following manner. That is, the image supply device executes a plurality of application programs in parallel and a display unit of the image supply device displays an image of each application program. The image supply device then supplies a copy of the image displayed by the display unit to the display device disclosed in JP-A-2019-015834. However, the configuration where a copy of the display image is supplied from the image supply device to the display device disclosed in JP-A-2019-015834 has a problem in that the image supply device needs to control the arrangement of the image of each application program in the display image, which is troublesome.

SUMMARY

According to an aspect of the present disclosure, an image generation device executes: communicating with a first terminal device currently executing a first application program and a second application program; thus acquiring first image data representing a first image displayed by the first terminal device according to the first application program and first resolution information representing a resolution of the first image; acquiring second image data representing a second image displayed by the first terminal device according to the second application program and second resolution information representing a resolution of the second image; deciding a first layout for arranging she first image and the second image in a predetermined area in an output image, based on the first resolution information and the second resolution information; and generating an output image having the first image and the second image arranged in the predetermined area according to the first layout, based on the first layout, the first image data, and the second image data.

According to another aspect of the present disclosure, a terminal device includes a display device and executes: executing a first application program and thus displaying a first image on the display device; executing a second application program and thus displaying a second image on the display device; and transmitting first image data representing the first image and first resolution information representing a resolution of the first image to a predetermined destination, and transmitting second image data representing the second image and second resolution information representing a resolution of the second image to the predetermined destination.

According to still another aspect of the present disclosure, an image generation method includes: communicating with a first terminal device currently executing a first application program and a second application program; thus acquiring first image data representing a first image displayed by the first terminal device according to the first application program and first resolution information representing a resolution of the first image; acquiring second image data representing a second image displayed by the first terminal device according to the second application program and second resolution information representing a resolution of the second image; deciding a first layout for arranging the first image and the second image in a predetermined area in an output image, based on the first resolution information and the second resolution information; and generating an output image having the first image and the second image arranged in the predetermined area according to the first layout, based on the first layout, the first image data, and the second image data.

DESCRIPTION OF EXEMPLARY EMBODIMENTS

Embodiments described below include various technically preferable limitations. However, embodiments of the present disclosure are not limited to those described below.

1. First Embodiment

Figure 1:
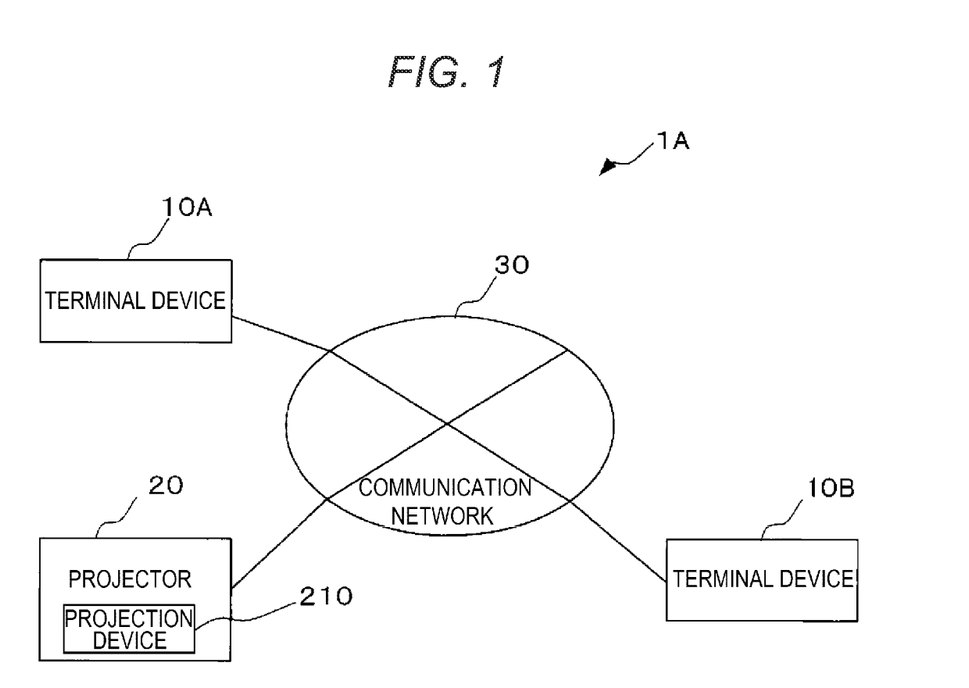
FIG. 1 shows an example of the configuration of an image projection system 1A according to a first embodiment of the present disclosure.

FIG. 1 shows an example of an image projection system 1A according to an embodiment of the present disclosure. The image projection system 1A includes a terminal device 10A, a terminal device 10B, and a projector 20. As shown in FIG. 1, the terminal device 10A, the terminal device 10B, and the projector 20 are connected to a communication network 30. The communication network 30 is, for example, a LAN (local area network) installed in a conference room or the like of a corporation. In this embodiment, the terminal device 10A, the terminal device 10B, and the projector 20 are placed in the conference room where the communication network 30 is installed. The terminal device 10A and the terminal device 10B are used by participants in a conference held the conference room where the communication network 30 is installed. The projector 20 is used to project an image of a material used in the conference held in the conference room where the communication network 30 is installed. The connection between the communication network 30 and each of the terminal device 10A, the terminal device 10B, and the projector 20 may be wired connection or wireless connection.

The projector 20 receives image data transmitted from the communication network 30. The projector 20 has an image processing device and a projection device 210. In FIG. 1, the illustration of the image processing device is omitted. The image processing device performs image processing such as keystone correction on the image data received via the communication network 30. The projection device 210 projects an image represented by the image data processed by the image processing device onto a projection surface such as projection screen. The terminal device 10A and the terminal device 10B are personal computers, for example. In this embodiment, the terminal device 10A and the terminal device 10B have the same configuration. Hereinafter, when the terminal device 10A and the terminal device 10B need not be distinguished from each other, each of the terminal device 10A and the terminal device 10B is referred to as the terminal device 10.

In the terminal device 10, a plurality of application programs are installed in advance. As an example of the application program installed in the terminal device 10, spreadsheet software and word processing software can be employed. The terminal device 10 can execute a plurality of application programs in parallel. The terminal device 10 in the state of executing a plurality of application programs causes its own display device to display an image according to each application program. Hereinafter, the image which the terminal device 10 causes its own display device to display according to the application program is referred to as an application image. Image data representing an application image is referred no as application image data. The terminal device 10 executing a plurality of application programs copies an application image for each application program and generates application image data representing the copied application image. In this embodiment, the application image is an image of a conference material.

In this embodiment, the terminal device 10B transmits application image data and resolution information representing the resolution of the application image represented by the application image data to the terminal device 10A for each application program. The resolution information represents the ratio of the number of pixels in the vertical direction of the application image to the number of pixels in the horizontal direction of the application image, that is, the aspect ratio. Meanwhile, the terminal device 10A generates output image data representing an output image to be projected from the projector 20, based on the application image data and the resolution information received from the terminal device 10B, and the application image data representing the application image displayed by the terminal device 10A's own display device according to the application program currently executed by the terminal device 10A and the resolution information. The terminal device 10A transmits the generated output image data to the projector 20 and thus causes the projector 20 to project the output image. In the description below, the device transmitting application image data such as the terminal device 10B is referred to as a client. Meanwhile, the device transmitting output image data such as the terminal device 10A is referred to as a moderator.

Figure 2:
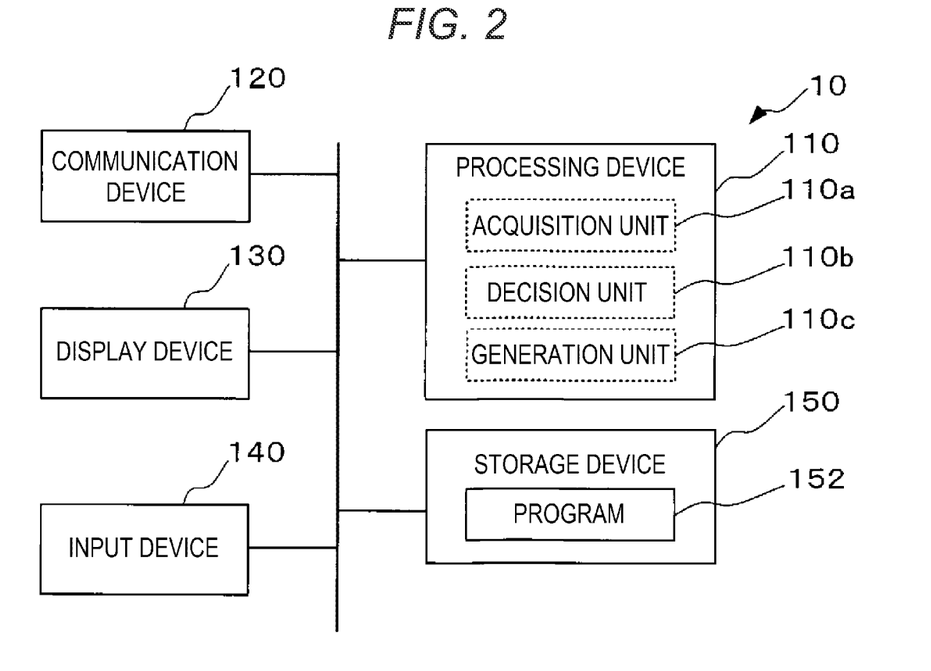
FIG. 2 shows an example of the configuration of a terminal device 10.

FIG. 2 shows an example of the configuration of the terminal device 10. As shown in FIG. 2, the terminal device 10 has a processing device 110, a communication device 120, a display device 130, an input device 140, and a storage device 150.

The communication device 120 is connected to the communication network 30 via a communication line such as a LAN cable. The communication device 120 is a device communicating data with another device via the communication network 30. In this embodiment, the another device to the terminal device 10A is the terminal device 10B or the projector 20. In this embodiment, the another device to the terminal device 10B is the terminal device 10A. As a specific example of the communication device 120, an NIC (network interface card) may be employed. The communication device 120 receives data transmitted from the another device via the communication network 30. The communication device 120 hands over the received data to the processing device 110. The communication device 120 also transmits data provided from the processing device 110, to the another device via the communication network 30.

The display device 130 is a liquid crystal display and a drive circuit thereof, for example. The display device 130 displays an image under the control of the processing device 110. As an example of the image displayed by the display device 130, an application image may be employed. The input device 140 includes, for example, a pointing device such as a mouse, and a keyboard. The input device 140 accepts a user's operation and hands over operation content data representing the content of the accepted operation, to the processing device 110. As the input device 140 hands over the operation content data to the processing device 110, the content of the user's operation is transmitted to the processing device 110.

The storage device 150 is a recording medium readable by the processing device 110. The storage device 150 includes a non-volatile memory and a volatile memory, for example. The non-volatile memory is a ROM (read-only memory), an EPROM (erasable programmable read-only memory), or an EEPROM (electrically erasable programmable read-only memory), for example. The volatile memory is a RAM (random-access memory), for example.

In the non-volatile memory of the storage device 150, various application programs such as spreadsheet software and word processing software are stored in advance, though not illustrated in detail in FIG. 2. In the non-volatile memory, a program 152 for causing the processing device 110 to execute processing that clearly represents a feature of the present disclosure is stored, as shown in FIG. 2. The volatile memory of the storage device 150 is used by the processing device 110 as a work area when executing the various application programs or the program 152.

The processing device 110 includes, for example, a processor such as a CPU (central processing unit), that is, a computer. The processing device 110 may be formed by a single computer or a plurality of computers. The processing device 110 reads out an application program from the non-volatile memory to the volatile memory in response to an instruction to start executing the application program by an input operation to the input device 140 and starts executing the application program thus read out. The processing device 110 executing the application program causes the display device 130 to display an application image corresponding to the application program and also copies the application image to generate application image data. The processing device 110 reads out the program 152 from the non-volatile memory to the volatile memory in response to an instruction to start executing the program 152 by an input operation to the input device 140 and starts executing the program 152 thus read out. The processing device 110 operating according to the program 152 operates as a client when instructed to operate as a client by the input operation to the input device 140. The processing device 110 operating according to the program 152 operates as a moderator when instructed to operate as a moderator by the input operation to the input device 140.

In this embodiment, an input operation instructing the processing device 110 to operate as a client is performed to the input device 140 of the terminal device 10B. Meanwhile, an input operation instructing the processing device 110 to operate as a moderator is performed to the input device 140 of the terminal device 10A. The processing device 110 instructed to operate as a client transmits application image data to a moderator. Meanwhile, the processing device 110 instructed to operate as a moderator functions as an acquisition unit 110a, a decision unit 110b, and a generation unit 110c shown in FIG. 2. That is, the acquisition unit 110a, the decision unit 110b, and the generation unit 110c in FIG. 2 are software modules implemented by the processing device 110 operating according to the program 152. In FIG. 2, dotted lines indicate that each of the acquisition unit 110a, the decision unit 110b, and the generation unit 110c is a software module. Each of the acquisition unit 110a, the decision unit 110b, and the generation unit 110c has the following functions.

The acquisition unit 110a communicates with the terminal device 10 functioning as the client and thus acquires application image data and resolution information of an application image corresponding to an application program currently executed by this terminal device 10, for each application program. In this embodiment, the acquisition unit 110a communicates with the terminal device 10B and thus acquires application image data and resolution information for each application program currently executed by the terminal device 10B. When the terminal device 10A is executing an application program such as spreadsheet software or word processing software, the acquisition unit 110a acquires application image data and resolution information of an application image corresponding to the application program currently executed by the terminal device 10A, for each application program.

The decision unit 110b decides a layout for arranging the application image of each application image data acquired by the acquisition unit 110a, in a display area in an output image, based on each resolution information acquired by the acquisition unit 110a. Hereinafter, the content of processing executed by the decision unit 110b will be described, using an example case where the terminal device 10A is not executing an application program anti where the terminal device 10B is executing spreadsheet software and word processing software.

Figure 3:
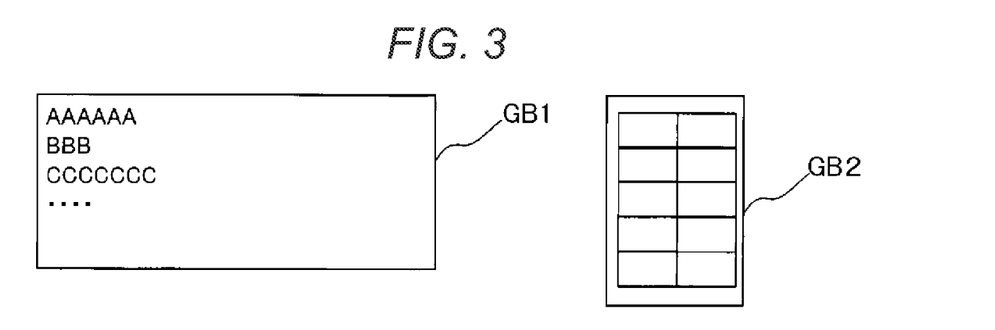
FIG. 3 shows an example of an application image GB1 and an application image GB2 displayed by a display device 130 of a terminal device 10B.

The terminal device 10B is executing spreadsheet software and word processing software. Therefore, the display device 130 of the terminal device 10B displays an application image GB1 and an application image GB2 shown in FIG. 3. The application image GB1 in FIG. 3 is an example of the application image of the word processing software. The application image GB2 in FIG. 3 is an example of the application image of the spreadsheet software. It is now assumed that application image data representing the application image GB1 and resolution information of the application image GB1 are acquired by the acquisition unit 110a and that application image data representing the application image GB2 and resolution information of the application image GB2 are acquired by the acquisition unit 110a. In this case, the decision unit 110b decides a layout of the application image GB1 and the application image GB2, based on a first mode, a second mode, or a third mode, described below.

Figure 4:
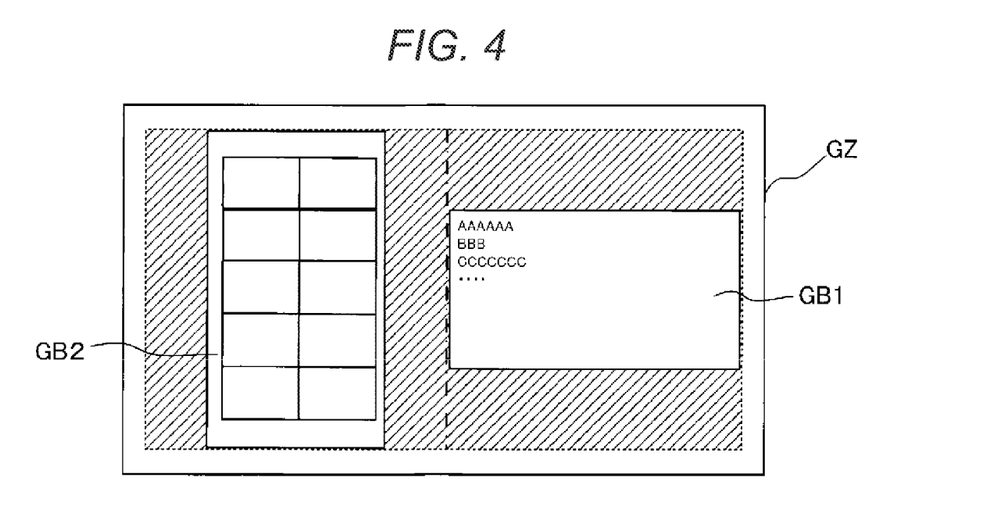
FIG. 4 shows an example of an output image GZ.

The first mode is a mode where the display area in the output image is equally divided according to the number of application image data acquired by the acquisition unit 110a and where the application image data are allocated to the divided areas on a one-to-one basis. FIG. 4 shows an example of an output image GZ with a layout decided based on the first mode. In FIG. 4, the display area in the output image GZ is indicated by a dotted-line rectangle. FIG. 4 also shows an example where the display area in the output image GZ is bisected in the horizontal direction. A dot-dash line in FIG. 4 indicates the boundary between the two divided areas. In the example shown in FIG. 4, the application image GB2 is arranged in the center of one divided area and the application image GB1 is arranged in the other divided area. The hatching in FIG. 4 represents a blank space where no application image exists. Similarly, in FIGS. 5 and 7, the hatching represents a blank space. An upper limit of the number of application images that can be allocated in the output image GZ may be decided in advance, and when a number of application image data exceeding the upper limit are acquired by the acquisition unit 110a, the application images may be allocated on a first-come-first-served basis and application images that are not allocated may be put in a standby state. In this case, the decision unit 110b may cause the display device 130 to display the application images in the standby state, in a thumbnail format.

In the case of the traditional screen sharing on a display screen basis, the aspect ratio of an image on the entire display screen is typically 16:9 or close to 16:9. Also, the aspect ratio of the resolution of the projection device 210 is typically 16:9 or close to 16:9. Therefore, a large blank space is not generated even when an image on the entire display screen is directly allocated to the display area in the output image. However, the aspect ratio of the application image GB1 is not necessarily 16:9 or close to 16:9 and the aspect ratio of the application image GB2 is not necessarily 16:9 or close to 16:9, either. Therefore, a large blank space is generated in the output image GZ shown in FIG. 4. The second mode and the third mode are modes where a layout of the application image GB1 and the application image GB2 is decided in such a way that the user viewing the application image GB1 and the application image GB2 does not feel that something is wrong and in such a way as to minimize the blank space in the display area in the output image GZ.

Figure 5:
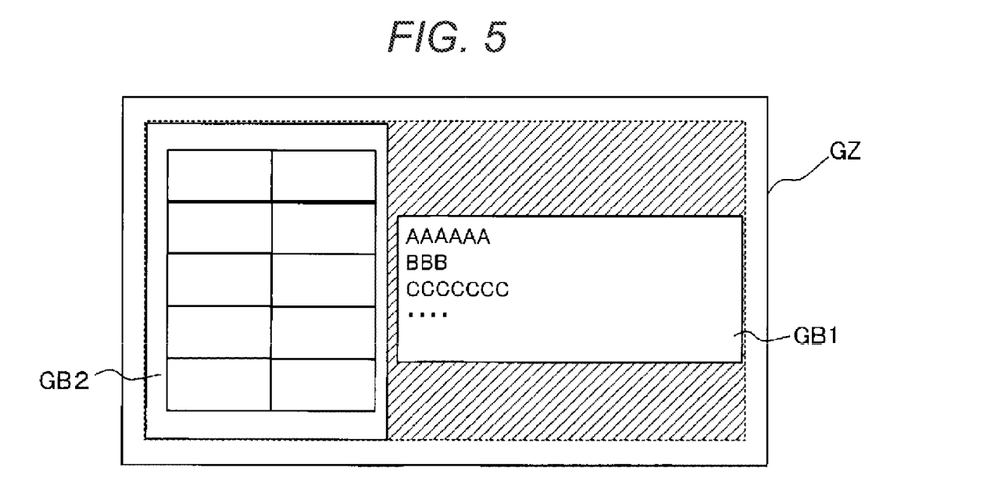
FIG. 5 shows another example of the output image GZ.

In the second mode, the decision unit 110*b* enlarges or reduces the application image GB1 while maintaining the aspect ratio represented by the resolution information of the application image GB1, enlarges or reduces the application image GB2 while maintaining the aspect ratio represented by the resolution information of the application image GB2, and allocates the enlarged or reduced application image GB1 and the enlarged or reduced application image GB2 in the display area in the output image GZ in such a way as to minimize the blank space. FIG. 5 shows an example of the output image GZ where the application image GB1 and the application image GB2 are arranged in the display area according to a layout decided based on the second mode. In the output image GZ shown in FIG. 5, the blank space is smaller than in the output image GZ shown in FIG. 4. In the output image GZ shown in FIG. 5, the aspect ratio of each of the application image GB1 and the application image GB2 is maintained. Therefore, the user paying attention to the application image GB1 or the application image GB2 in the output image GZ does not feel that something is significantly wrong. In this embodiment, the second mode is employed as the mode of processing by the decision unit 110*b*.

In the third mode, the decision unit 110*b* compares the level of priority of the application image GB1 with the level of priority of the application image GB2, enlarges the application image with the higher level of priority to a maximum size that fits within the display area while maintaining the aspect ratio represented by the resolution information, and thus allocates this application image in the display area. The decision unit 110*b* reduces the other application image to a size that fits within the blank space in the display area where the application image with the higher level of priority is allocated, while maintaining the aspect ratio represented by the resolution information of this other application image, and thus arranges this application image. The levels of priority of the application images may be decided in advance according to the types of the application programs or may be designated by the user every time application image data is acquired by the acquisition unit 110*a*.

Figure 6:
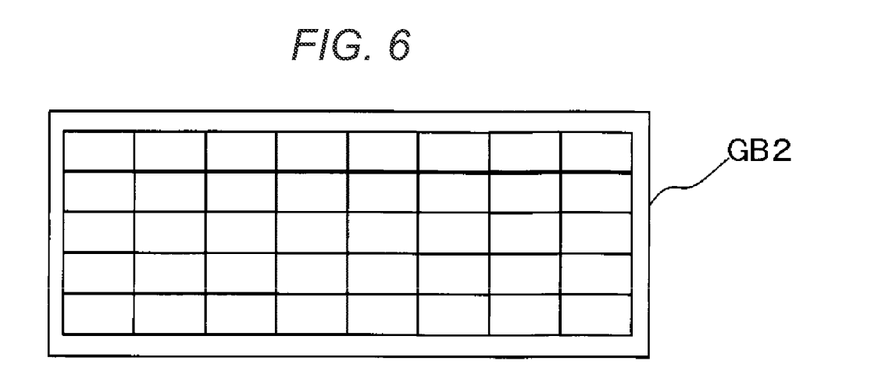
FIG. 6 shows another example of the application image GB2.
Figure 7:
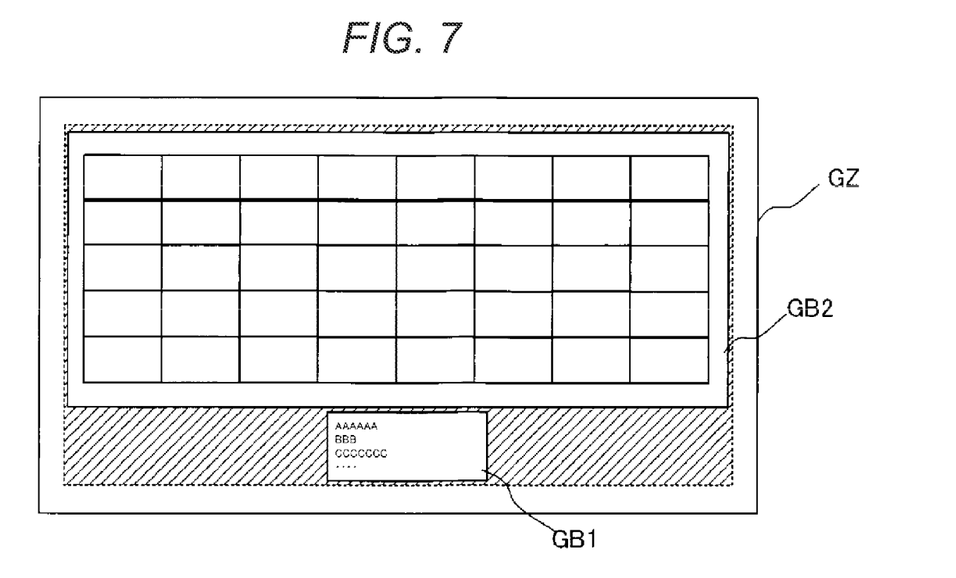
FIG. 7 shows still another example of the output image GZ.

For example, it is assumed that application image data representing the application image GB1 shown in FIG. 3 and application image data representing the application image GB2 shown in FIG. 6 are acquired by the acquisition unit 110*a*. It is also assumed that the user of the terminal device 10A designates a higher level of priority for the application image GB2 than for the application image GB1 by operating the input device 14 of the terminal device 10A. In this case, the decision unit 110*b* first enlarges the application image GB2 to a maximum size that fits within the display area while maintaining the aspect ratio represented by the resolution information and thus allocates the application image GB2 in the display area. Then, the decision unit 110*b* reduces the application image GB1 to a size that fits within the blank space in the display area where the application image GB2 is allocated, while maintaining the aspect ratio represented by the resolution information, and thus arranges the application image GB1. Consequently, a layout of the application image GB1 and the application image GB2 in the output image GZ is decided, as shown in FIG. 7. In the output image GZ shown in FIG. 7, the blank space is smaller than in the output image GZ shown in FIG. 4. In the output image GZ shown in FIG. 7, the aspect ratio of each of the application image GB1 and the application image GB2 is maintained. Therefore, the user paying attention to the application image GB1 or the application image GB2 in the output image GZ does not feel that something is significantly wrong.

When deciding a layout based on the second mode or the third mode, the decision unit 110*b* may notify the terminal device 10B of the rate of enlargement or the rate of reduction of each application image. In this case, the terminal device 10B may transmit application image data representing the application image enlarged at the rate of enlargement notified from the terminal device 10A or the application image reduced at the rate of reduction notified from the terminal device 10A, to the terminal device 10A. When the application image is reduced and thus arranged in the display area, transmitting the application image data representing the reduced application image from the terminal device 10B to the terminal device 10A can reduce the communication traffic.

Based on the layout decided by the decision unit 110*b* and each application image data acquired by the acquisition unit 110*a*, the generation unit 110*c* generates output image data representing an output image where the application image represented by each application image data is arranged in the display area according to the layout. The generation unit 110*c* transmits the generated output image data to the projector 20.

Figure 8:
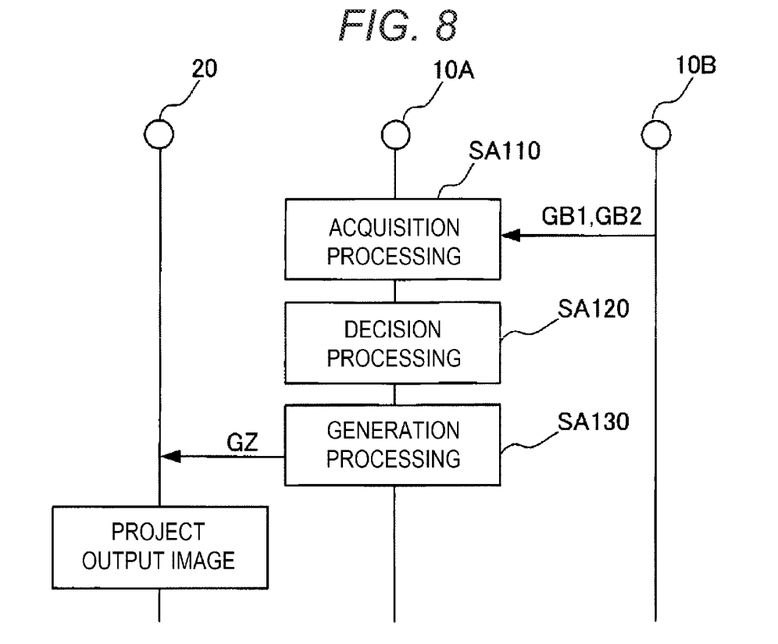
FIG. 8 shows a flow of an image generation method in the first embodiment.

The processing device 110 of the terminal device 10A executes the image generation method according to she present disclosure, based on the program 152. FIG. 8 shows a flow of the image generation method. As shown in FIG. 8, the image generation method according to the present disclosure includes acquisition processing SA110, decision processing SA120, and generation processing SA130.

In the acquisition processing SA110, the processing device 110 functions as the acquisition unit 110*a*. In the acquisition processing SA110, the processing device 110 communicates with the terminal device 10 functioning as the client and thus acquires application image data and resolution information of an application image corresponding to an application program currently executed by that terminal device 10, for each application program. When the terminal device 10A is executing an application program, the processing device 110 acquires application image data and resolution information of an application image corresponding to the application program currently executed by the terminal device 10A, for each application program.

In the decision processing SA120, the processing device 110 functions as the decision unit 110*b*. In the decision processing SA120, the processing device 110 decides a layout for arranging the application image represented by each application image data acquired in the acquisition processing SA110, in a display area in an output image, based on each resolution information acquired in the acquisition processing SA110.

In the generation processing SA130, the processing device 110 functions as the generation unit 110*c*. In the generation processing SA130, based on the layout decided in the decision processing SA120 and each application image data acquired in the acquisition processing SA110, the processing device 110 generates output image data representing an output image where the application image represented by each application image data is arranged in the display area according to the layout. In the generation processing SA130, the processing device 110 transmits the generated output image data to the projector 20.

For example, it is assumed that application image data representing the application image GB1 shown in FIG. 3 and resolution information representing the resolution of the application image GB1, and application image data representing the application image GB2 shown in FIG. 3 and resolution information representing the resolution of the application image GB2, are transmitted from the terminal device 10B to the terminal device 10A, as shown in FIG. 8. In the acquisition processing SA110, the processing device 110 acquires the application image data representing the application image GB1 and the resolution information representing the resolution of the application image GB1, and the application image data representing the application image GB2 and the resolution information representing the resolution of the application image GB2. In the decision processing SA120 following the acquisition processing SA110, the processing device 110 decides a layout of the application image GB1 and the application image GB2 based on the second mode. In the generation processing SA130 following the decision processing SA120, the processing device 110 generates output image data representing the output image GZ shown in FIG. 5 according to the layout decided in the decision processing SA120 and transmits this output image data to the projector 20. Thus, the projector 20 projects the output image GZ shown in FIG. 5 onto the projection surface.

This embodiment enables the generation of the output image GZ having the application image GB1 and the application image GB2 efficiently arranged therein in such a way as to minimize the blank space in the display area. The terminal device 10B transmits image data to the terminal device 10A on an application image basis. Therefore, the terminal device 10B need not control the layout of the application image GB1 and the application image GB2 in the output image GZ.

2. Second Embodiment

Figure 9:
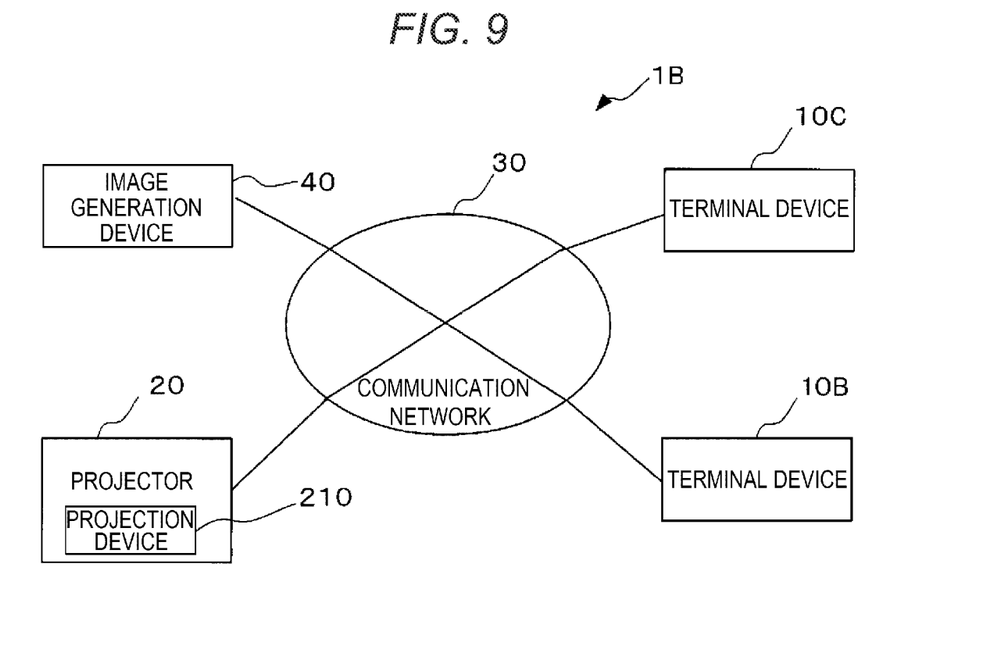
FIG. 9 shows an example of the configuration of an image projection system 1B according to a second embodiment of the present disclosure.

FIG. 9 shows an example of the configuration of an image projection system 1B according to a second embodiment of the present disclosure. In FIG. 9, the same components as in FIG. 1 are denoted by the same reference numbers. As shown in FIG. 9, the image projection system 1B has a terminal device 10C instead of the terminal device 10A. The terminal device 10C differs from the terminal device 10A in functioning as a client. As shown in FIG. 9, the image projection system 1B has an image generation device 40. The image generation device 40 communicates with each of the terminal device 10b, the terminal device 10C, and the projector 20 via the communication network 30. In the image projection system 1B, the image generation device 40 functions as a moderator.

Figure 10:
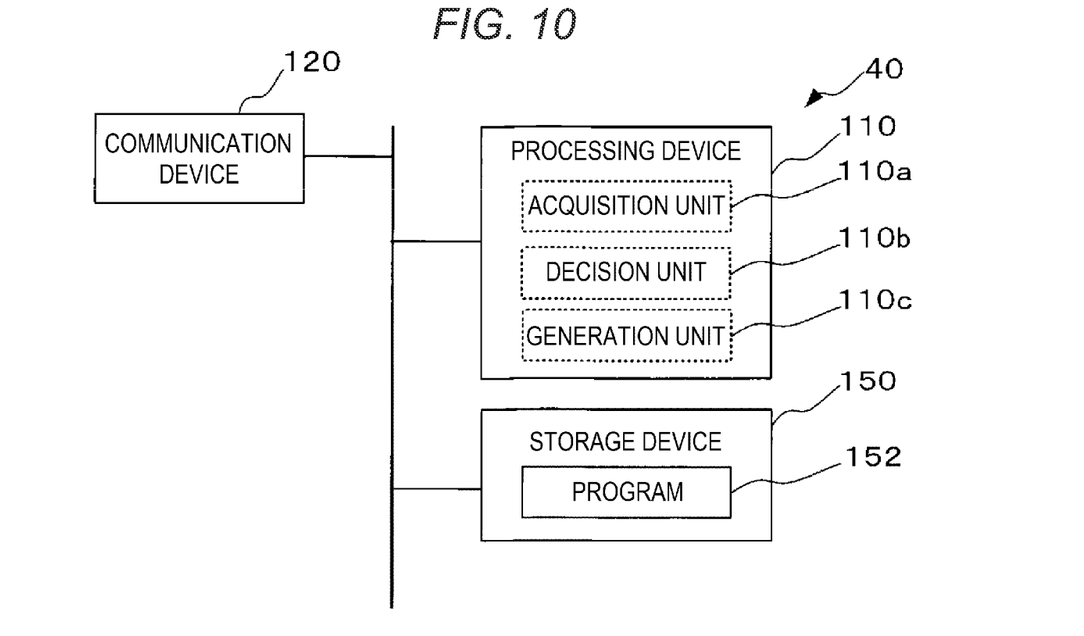
FIG. 10 shows an example of the configuration of an image generation device 40.

FIG. 10 shows an example of the configuration of the image generation device 40. As shown in FIG. 10, the image generation device 40 has the processing device 110, the communication device 120, and the storage device 150. In this embodiment, too, the program 152 is stored in the storage device 150 in advance, as shown in FIG. 10. However, application programs such as spreadsheet software and word processing software are not stored in the storage device 150 of the image generation device 40. This is because the image generation device 40 does non execute an application program. Since the image generation device 40 does not execute an application program, the image generation device 40 does not have the display device 130 and the input device 140.

Figure 11:
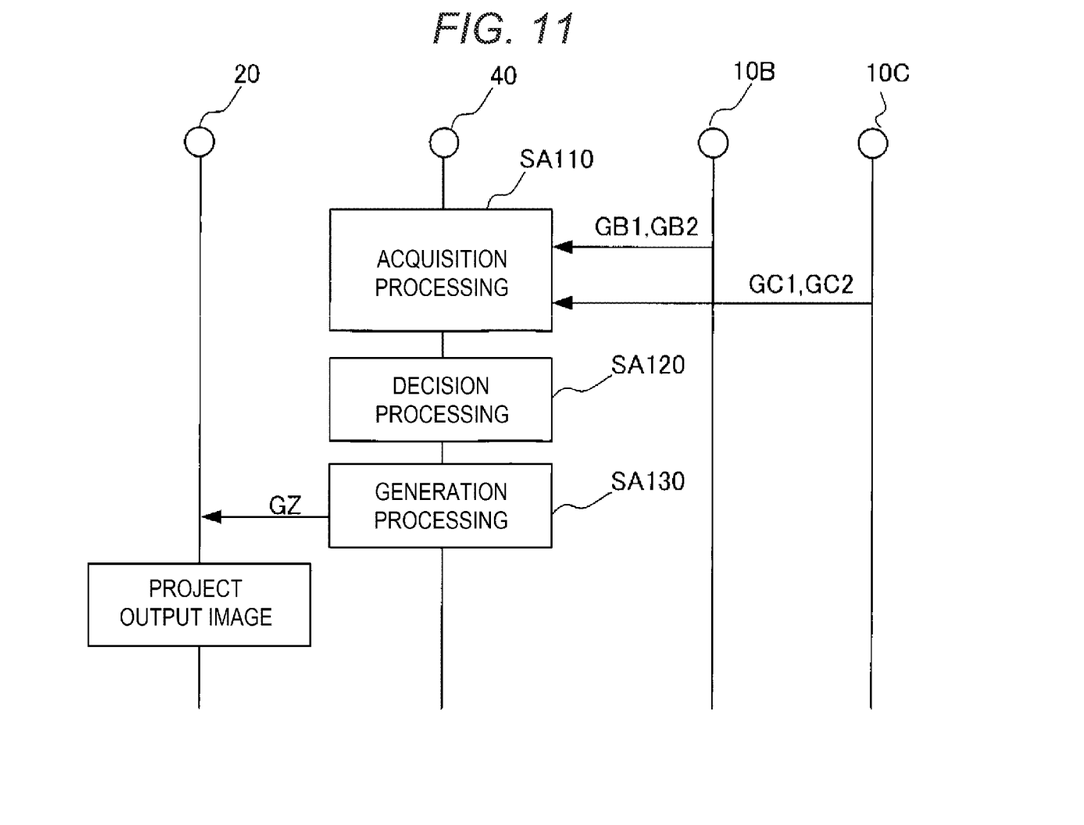
FIG. 11 shows a flow of an image generation method in the second embodiment.

The processing device 110 of the image generation device 40 starts executing the program 152 in response to the power of the image generation device 40 being switched on. The processing device 110 operating according to the program 152 functions as the acquisition unit 110a, the decision unit 110b, and the generation unit 110c, as shown in FIG. 10. By operating according to the program 152, the processing device 110 of the image generation device 40 executes the image generation method according to the present disclosure. FIG. 11 shows a flow of the image generation method. As shown in FIG. 11, the image generation method includes acquisition processing SA110, decision processing SA120, and generation processing SA130. In the acquisition processing SA110, the processing device 110 of the image generation device 40 functions as the acquisition unit 110a. In the decision processing SA120, the processing device 110 of the image generation device 40 functions as the decision unit 110b. In the generation processing SA130, the processing device 110 of the image generation device 40 functions as the generation unit 110c.

For example, it is assumed that application image data representing an application image GB1 and resolution information representing the resolution of the application image GB1, and application image data representing an application image GB2 and resolution information representing the resolution of the application image GB2, are transmitted from the terminal device 10B to the image generation device 40, as shown in FIG. 1. It is also assumed that application image data representing an application image GC1 and resolution information representing the resolution of the application image GC1, and application image data representing an application image GC2 and resolution information representing the resolution of the application image GC2, are transmitted from the terminal device 10C to the image generation device 40, as shown in FIG. 11. In the acquisition processing SA110, the processing device 110 acquires the application image data representing the application image GB1 and the resolution information representing the resolution of the application image GB1, and the application image data representing the application image GB2 and the resolution information representing the resolution of the application image GB2. Also, in the acquisition processing SA110, the processing device 110 acquires the application image data representing the application image GC1 and the resolution information representing the resolution of the application image GC1, and the application image data representing the application image GC2 and the resolution information representing the resolution of the application image GC2. Subsequently, in the decision processing SA120, a layout of the application image GB1, the application image GB2, the application image GC1, and the application image GC2 is decided, based on the second mode. In the generation processing SA130, output image data representing an output image GZ where the application image GB1, the application image GB2, the application image GC1, and the application image GC2 are arranged in the display area according to the layout is generated. This embodiment enables the projector 20 to project the output image GZ having the application images GB1 and GB2 from the terminal device 10B and the application images GC1 and GC2 from the terminal device 10C efficiently arranged therein in such a way as to minimize the blank space in the display area.

3. Modifications

The embodiments can be modified as follows.
(1) The generation processing SA130 in each of the embodiments may include processing of providing an application image with a frame drawn in a color corresponding to the type of the application program. For example, a frame line drawn in red is provided for the application image of the word processing software, and a frame line drawn in blue is provided for the application image of the spreadsheet software. This configuration enables the user viewing the output image to grasp the type of the application program of the application image displayed by the terminal device 10.

(2) The generation processing SA130 in each of the embodiments may include processing of providing an application image with a frame drawn in a color corresponding to the terminal device 10 of the transmission source of the application image data. For example, a frame line drawn in red is provided for the application image represented by the application image data transmitted from the terminal device 10B, and a frame line drawn in blue is provided for the application image represented by the application image data transmitted from the terminal device 10C. This configuration enables the user viewing the output image to grasp the terminal device 10 currently executing an application program.

Figure 12:
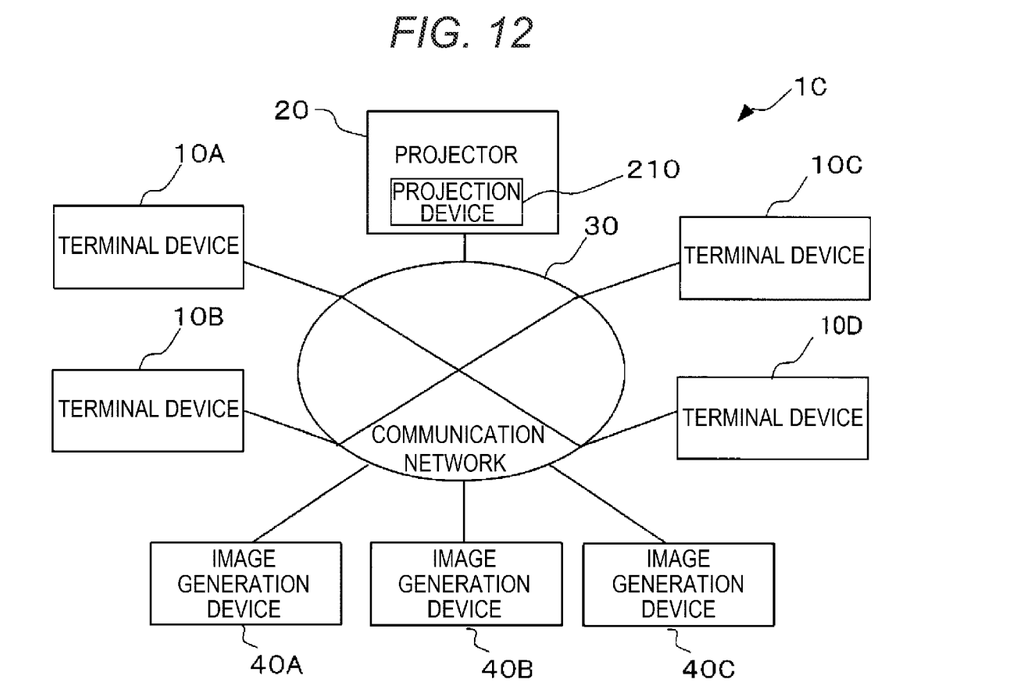
FIG. 12 shows an example of the configuration of an image projection system 1C according to modification example (3).
Figure 13:
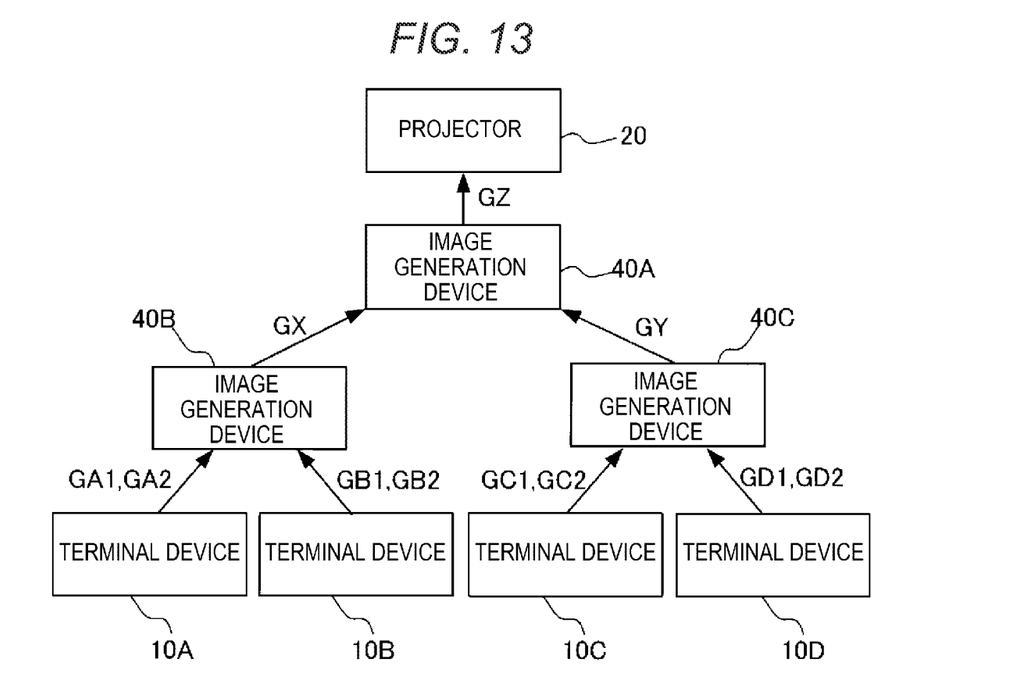
FIG. 13 shows an example of a logical connection relationship in the image projection system 1C.

(3) An image generation device 40A, an image generation device 40B, and an image generation device 40C, each having the same configuration as the image generation device 40, may be connected to the communication network 30, as in an image projection system 1C shown in FIG. 12. As shown in FIG. 12, the image projection system 1C includes the terminal device 10A, the terminal device 10B, the terminal device 10C, and a terminal device 10D, each being connected to the communication network 30. FIG. 13 shows an example of the logical topology of the image projection system 1C. The logical topology of the image projection system 1C is the logical connection relationship between the projector 20, the terminal devices 10A to 10D, and the image generation devices 40A to 400 in the image projection system 1C. In the image projection system 1C, each of the terminal devices 10A to 10D functions as a client. The terminal device 10A and the terminal device 10B transmit application image data and resolution information to the image generation device 40B. The terminal device 10C and the terminal device 10D transmit application image data and resolution information to the image generation device 40C.

The image generation device 40B generates output image data representing an output image GX where an application image GA1 and an application image GA2 representing application image data received from the terminal device 10A and an application image GB1 and an application image GB2 representing application image data received from the terminal device 10B are arranged in the display area. The image generation device 40B transmits output image data representing the output image GX and resolution information representing the resolution of the output image GX to the image generation device 40A. The image generation device 40C generates output image data representing an output image GY where an application image GC1 and an application image GC2 representing application image data received from the terminal device 10C and an application image GD1 and an application image GD2 representing application image data received from the terminal device 10D are arranged in the display area. The image generation device 40C transmits output image data representing the output image GY and resolution information representing the resolution of the output image GY to the image generation device 40A.

The image generation device 40A generates output image data representing an output image GZ where output images represented by the output image data received respectively from the image generation device 40B and the image generation device 40C are arranged in the display area. The image generation device 40A transmits the generated output image data to the projector 20 and thus causes the projector 20 to project the output image GZ. In this configuration, the execution of the processing of generating the output image data representing the output image GZ to be projected from the projector 20, based on the application image data transmitted from each of the terminal devices 10A to 10D, can be shared among the image generation device 40A, the image generation device 40B, and the image generation device 40C. That is, the output image GZ can be generated while the workload is distributed.

(4) The acquisition unit 110a, the decision unit 110b, and the generation unit 110c in each of the embodiments are software modules. However, these units may be hardware modules such as an ASIC (application-specific integrated circuit). The image generation device 40 in the second embodiment may be included in the projector 20. The projector 20 including the image generation device 40 functions as a moderator and also projects an output image generated by the image generation device 40 onto the projection surface by the projection device 210. An image projection system where the projector 20 including the image generation device 40, and one or a plurality of terminal devices 10 each functioning as a client, are connected to the communication network 30, has the same effects as the first and second embodiments. The terminal device 10A in the first embodiment, the image generation device 40 in the second embodiment, or the projector 20 including the image generation device 40 may be manufactured or sold separately. Also, the image generation device 40 may be connected to a general public network such as the internet and a communication service for generating an output image by the image generation method according to the present disclosure and transmitting the output image may be provided in an ASP (application service provider) format.

(5) The terminal device 10A in the first embodiment may transmit output image data to the terminal device 10B and cause the terminal device 10B to display an output image represented by the output image data. In this configuration, even when the communication network 30 is the internet, for example, and the place where the terminal device 10B is installed is remote from the place where the projector 20 is installed, the users of the terminal device 10A and the terminal device 10B can share a conference material. Similarly, the image generation device 40 in the second embodiment may transmit output image data to each of the terminal device 10B and the terminal device 10C.

(6) In each of the embodiments, the program 152 is already stored in the storage device 150. However, the program 152 may be manufactured or distributed separately. As a specific method for distributing the program 152, the program 152 may be written in a computer-readable recording medium such as a flash ROM (read-only memory) and distributed in this way, or the program 152 may be downloaded and thus distributed via a telecommunications network such as the internet. Causing a general computer to operate according to the program 152 distributed by these methods enables the computer to function as the image generation device according to the present disclosure.

4. Aspects Grasped from at Least One of Embodiments and Modification Examples

The present disclosure is not limited to the foregoing embodiments and modification examples and can be implemented according to various other aspects without departing from the spirit and scope of the present disclosure. For example, the present disclosure can be implemented according to the aspects described below. A technical feature in the embodiments corresponding to a technical feature in each of the aspects described below can be suitably replaced or combined in order to solve a part or all of the problems of the present disclosure or in order to achieve a part or all of the effects of the present disclosure. The technical feature can be suitably deleted unless described as essential in the specification.

According to an aspect of the present disclosure, the image generation device has the acquisition unit 110a, the decision unit 110b, and the generation unit 110c described below. The acquisition unit 110a executes the acquisition processing SA110. In the acquisition processing SA110, the acquisition unit 110a communicates with the terminal device 10B currently executing a first application program and a second application program. In the acquisition processing SA110, the acquisition unit 110a acquires first image data representing the application image GB1 displayed by the terminal device 10B according to the first application program and first resolution information representing the resolution of the application image GB1. The terminal device 10B is an example of the first terminal device according to the present disclosure. The application image GB1 is an example of the first image according to the present disclosure. In the acquisition processing SA110, the acquisition unit 110a also acquires second image data representing the application image GB2 displayed by the terminal device 10B according to the second application program and second resolution information representing the resolution of the application image GB2. The application image GB2 is an example of the second image according to the present disclosure. The decision unit 110b executes the decision processing SA120. The decision processing SA120 is the processing of deciding a first layout, based on the first resolution information and the second resolution information. The first layout shows an arrangement of the application image GB1 and the application image GB2 for arranging the application image GB1 and the application image GB2 in the display area in the output image GZ. The display area in the output image GZ is an example of the predetermined area according to the present disclosure. The generation unit 110c executes the generation processing SA130. The generation processing SA130 is the processing of generating output image data representing the output image GZ, based on the first layout, the first image data, and the second image data. The output image data represents the output image GZ having the application image GB1 and the application image GB2 arranged in the display area according to the first layout. The image generation device according to this aspect can generate the output image GZ having the first image and the second image efficiently arranged in the predetermined area.

According to another aspect, in the acquisition processing SA110, the acquisition unit 110a in the image generation device may communicate with the terminal device 10C currently executing a third application program and a fourth application program. The terminal device 10C is an example of the second terminal device according to the present disclosure. In the acquisition processing SA110 according to this aspect, the acquisition unit 110a acquires third image data representing the application image GC1 displayed by the terminal device 10C according to the third application program and third resolution information representing the resolution of the application image GC1. The application image GC1 is an example of the third image according to the present disclosure. In the acquisition processing SA110 according to this aspect, the acquisition unit 110a also acquires fourth image data representing the application image GC2 displayed by the terminal device 10C according to the fourth application program and fourth resolution information representing the resolution of the application image GC2. The application image GC2 is an example of the fourth image according to the present disclosure. In the decision processing SA120 according to this aspect, the decision unit 110b decides a second layout, based on the first resolution information, the second resolution information, the third resolution information, and the fourth resolution information. The second layout shows an arrangement of the application image GB1, the application image GB2, the application image GC1, and the application image GC2 for arranging the application image GB1, the application image GB2, the application image GC1, and the application image GC2 the display area in the output image CZ. In the generation processing SA130 according to this aspect, the generation unit 110c generates output image data, based on the second layout, the first image data, the second image data, the third image data, and the fourth image data. The output image data represents the output image GZ having the application image GB1, the application image GB2, the application image GC1, and the application image GC2 arranged in the display area according to the second layout. The image generation device according to this aspect can generate the output image GZ having the application image GB1, the application image GB2, the application image GC1, and the application image GC2 efficiently arranged in the display area.

According to another aspect, the image generation device may execute transmission processing described below. In the transmission processing, the image processing device transmits output image data representing an output image to the first terminal device and thus causes the first terminal device to display the output image. In the transmission processing, the image generation device also transmits the output image data to the second terminal device and thus causes the second terminal device to display the output image. According to this aspect, a remote conference can be held with a plurality of participants in the remote conference sharing a conference material.

According to another aspect, the generation processing SA130 by the image generation device may include first processing, second processing, third processing, and fourth processing described below. The first processing is the processing of providing the first image with a frame drawn in a color corresponding to the type of the first application program. The second processing is the processing of providing the second image with a frame drawn in a color corresponding to the type of the second application program. The third processing is the processing of providing the third image with a frame drawn in a color corresponding to the type of the third application program. The fourth processing is the processing of providing the fourth image with a frame drawn in a color corresponding to the type of the fourth application program. The image generation device according to this aspect enables the user viewing the output image to grasp the type of the application program displaying each of the first image, the second image, the third image, and the fourth image.

According to another aspect, the generation processing SA130 by the image generation device may include fifth processing and sixth processing described below. The fifth processing is the processing of providing each of the first image and the second image with a frame drawn in a color corresponding to the first terminal device. The sixth processing is the processing of providing each of the third image and the fourth image with a frame drawn in a color corresponding to the second terminal device. The image generation device according to this aspect enables the user viewing the output image to grasp the terminal device currently executing the application program displaying each of the first image, the second image, the third image, and the fourth image.

According to another aspect, the image generation device may include a projection device projecting the output image onto a projection surface. The foregoing projector including the image generation device 40 is an example of the image generation device according to this aspect. According to this aspect, a projector communicating with terminal devices used respectively by a plurality of participants in a conference can play the role of a moderator.

According to another aspect of the present disclosure, the terminal device includes the display device 130 and executes seventh processing, eighth processing, and ninth processing described below. The seventh processing is the processing of executing the first application program and thus causing the display device 130 to display the application image GB1. The eighth processing is the processing of executing the second application program and thus causing the display device 130 to display the application image GB2. The ninth processing is the processing of transmitting first image data representing the application image GB1 and first resolution information representing the resolution of the application image GB1 to a device functioning as a moderator, and transmitting second image data representing the application image GB2 and second resolution information representing the resolution of the application image GB2 to the device functioning as the moderator. The device functioning as the moderator is an example of the predetermined destination according to the present disclosure. A specific example of the device functioning as the moderator may be the terminal device 10A in the first embodiment or the image generation device 40. The terminal device according to this aspect, too, can generate an output image having the first image and the second image efficiently arranged in the predetermined area.

According to another aspect of the present disclosure, the image generation method includes the acquisition processing SA110, the decision processing SA120, and the generation processing SA130 described above. The image generation method according to this aspect, too, can generate an output image having the first image and the second image efficiently arranged in the predetermined area.

What is claimed is:

1. An image generation device comprising:
one or a plurality of processors executing:
communicating with a first terminal device executing a first application program and a second application program;
acquiring first image data representing a first image displayed by the first terminal device according to the first application program and first resolution information representing a resolution of the first image;
acquiring second image data representing a second image displayed by the first terminal device according to the second application program and second resolution information representing a resolution of the second image;
deciding a layout for arranging the first image and the second image in an output image, based on the first resolution information and the second resolution information; and
generating an output image having the first image and the second image arranged therein, based on the layout, the first image data, and the second image data,
wherein deciding the layout includes:
enlarging one application image of the first image and the second image having a higher level of priority to a maximum size that fits within the output image while maintaining the aspect ratio;
allocating the one application image in the output image;
reducing the other application image of the first image and the second image to a size that fits within a blank space in the output image; and
allocating the other application image in the blank space.

2. The image generation device according to claim 1,
the one or plurality of processors further executes:
communicating with a second terminal device executing a third application program and a fourth application program;
acquiring third image data representing a third image displayed by the second terminal device according to the third application program and third resolution information representing a resolution of the third image; and
acquiring fourth image data representing a fourth image displayed by the second terminal device according to the fourth application program and fourth resolution information representing a resolution of the fourth image, wherein
the deciding the layout includes deciding the layout for arranging the first image, the second image, the third image, and the fourth image, based on the first resolution information, the second resolution information, the third resolution information, and the fourth resolution information, and
the generating includes generating the output image having the first image, the second image, the third image, and the fourth image arranged therein, based on the layout, the first image data, the second image data, the third image data, and the fourth image data.

3. The image generation device according to claim 2, wherein
the generating includes:
providing the first image with a frame drawn in a first color corresponding to a type of the first application program;
providing the second image with a frame drawn in a second color corresponding to a type of the second application program;
providing the third image with a frame drawn in a third color corresponding to a type of the third application program; and
providing the fourth image with a frame drawn in a fourth color corresponding to a type of the fourth application program.

4. The image generation device according to claim 2, wherein
the generating includes:
providing each of the first image and the second image with a frame drawn in a fifth color corresponding to the first terminal device; and providing each of the third image and the fourth image with a frame drawn in a sixth color corresponding to the second terminal device.

5. The image generation device according to claim 2, the one or plurality of processors further executes:

transmitting output image data representing the output image to the first terminal device and thus causing the first terminal device to display the output image; and transmitting the output image data to the second terminal device and thus causing the second terminal device to display the output image.

6. An image generation method comprising:

communicating with a first terminal device executing a first application program and a second application program;

acquiring first image data representing a first image displayed by the first terminal device according to the first application program and first resolution information representing a resolution of the first image;

acquiring second image data representing a second image displayed by the first terminal device according to the second application program and second resolution information representing a resolution of the second image;

deciding a layout for arranging the first image and the second image in an output image, based on the first resolution information and the second resolution information; and generating an output image having the first image and the second image arranged therein, based on the layout, the first image data, and the second image data, wherein deciding the layout includes:

enlarging one application image of the first image and the second image having a higher level of priority to a maximum size that fits within the output image while maintaining the aspect ratio;

allocating the one application image in the output image;

reducing the other application image of the first image and the second image to a size that fits within a blank space in the output image; and allocating the other application image in the blank space.

* * * * *